(12) United States Patent
Palfner

(10) Patent No.: US 8,115,864 B2
(45) Date of Patent: Feb. 14, 2012

(54) METHOD AND APPARATUS FOR RECONSTRUCTING IMAGE

(75) Inventor: Torsten Palfner, Langen (DE)

(73) Assignee: Panasonic Corporation, Osaka (JP)

( * ) Notice: Subject to any disclaimer, the term of this patent is extended or adjusted under 35 U.S.C. 154(b) by 1102 days.

(21) Appl. No.: 11/952,473

(22) Filed: Dec. 7, 2007

(65) Prior Publication Data

US 2008/0136963 A1 Jun. 12, 2008

(30) Foreign Application Priority Data

Dec. 8, 2006 (EP) ..................................... 06025458

(51) Int. Cl.
*H04N 11/20* (2006.01)
*H04N 7/01* (2006.01)

(52) U.S. Cl. ........ 348/448; 348/441; 348/443; 348/446; 348/452; 348/458; 348/459; 382/199; 382/264; 382/300

(58) Field of Classification Search .................. 348/448, 348/452, 441, 446, 443, 458–459; 328/199, 328/300, 264; 375/240.26
See application file for complete search history.

(56) References Cited

U.S. PATENT DOCUMENTS

| | | | |
|---|---|---|---|
| 5,661,525 A * | 8/1997 | Kovacevic et al. | 348/452 |
| 5,832,143 A * | 11/1998 | Suga et al. | 382/300 |
| 5,886,745 A * | 3/1999 | Muraji et al. | 348/448 |
| 6,219,464 B1 * | 4/2001 | Greggain et al. | 382/298 |
| 6,239,842 B1 * | 5/2001 | Segman | 348/448 |
| 6,331,874 B1 * | 12/2001 | de Garrido et al. | 348/452 |
| 6,573,941 B1 * | 6/2003 | Willis et al. | 348/448 |
| 6,909,752 B2 * | 6/2005 | Zhou | 375/240.21 |
| 7,116,372 B2 * | 10/2006 | Kondo et al. | 348/448 |
| 7,242,435 B2 * | 7/2007 | Lin et al. | 348/448 |
| 7,259,794 B2 * | 8/2007 | Chang et al. | 348/452 |
| 7,587,091 B2 * | 9/2009 | Loukianov et al. | 382/239 |
| 7,663,695 B2 * | 2/2010 | Pau et al. | 348/452 |
| 2002/0047919 A1 * | 4/2002 | Kondo et al. | 348/441 |
| 2003/0081144 A1 * | 5/2003 | Mohsenian | 348/448 |
| 2004/0119884 A1 * | 6/2004 | Jiang | 348/448 |
| 2004/0233328 A1 * | 11/2004 | Tsao et al. | 348/452 |
| 2005/0008248 A1 * | 1/2005 | Wang | 382/260 |

(Continued)

OTHER PUBLICATIONS

Paul Delogne, et al., "*Improved Interpolation, Motion Estimation, and Compensation for Interlaced Pictures*", IEEE Transactions on Image Processing, vol. 3, No. 5, Sep. 1994.

*Primary Examiner* — Pankaj Kumar
*Assistant Examiner* — Mulugeta Mengesha
(74) *Attorney, Agent, or Firm* — Wenderoth, Lind & Ponack, L.L.P.

(57) ABSTRACT

The present invention relates to the field of video data de-interlacing, and in particular to a method for reconstructing full-resolution frames from a line-skipped-sequence of fields and a corresponding apparatus. It is the particular approach of the present invention to substitute missing lines of a block of a reconstructed full-resolution frame by lines from another field, e.g. the preceding field, and translating the substitute lines vertically and horizontally so as to optimized a smoothness measure computed for the thus reconstructed block. In this manner, an error-prone a priori determination of motion vectors based an interpolation of the interlaced images in the vertical direction can be avoided. The present invention may also be applied to sequences generated from a full-resolution sequence by a line-skipping operation that keeps only every $K^{th}$ line and discards the other K−1 lines.

22 Claims, 12 Drawing Sheets

U.S. PATENT DOCUMENTS

| | | |
|---|---|---|
| 2005/0030422 A1* | 2/2005 | Leone et al. .................. 348/441 |
| 2005/0110901 A1* | 5/2005 | Alfonso et al. ............... 348/448 |
| 2005/0134730 A1* | 6/2005 | Winger et al. ................ 348/448 |
| 2005/0157951 A1* | 7/2005 | Xavier ........................... 382/300 |
| 2005/0179814 A1* | 8/2005 | Pau et al. ...................... 348/448 |
| 2006/0033839 A1* | 2/2006 | Chao ............................. 348/448 |
| 2006/0093228 A1* | 5/2006 | Loukianov et al. ........... 382/236 |
| 2006/0109377 A1* | 5/2006 | Chao ............................. 348/448 |
| 2006/0146187 A1* | 7/2006 | Handjojo et al. ............. 348/448 |
| 2006/0222266 A1 | 10/2006 | Lauze et al. |
| 2006/0227242 A1* | 10/2006 | Chao ............................. 348/452 |
| 2006/0256237 A1* | 11/2006 | Barnichon ..................... 348/448 |
| 2007/0206117 A1* | 9/2007 | Tian et al. ..................... 348/452 |
| 2007/0247547 A1* | 10/2007 | Liu et al. ....................... 348/458 |

\* cited by examiner

METHOD AND APPARATUS FOR RECONSTRUCTING IMAGE

BACKGROUND OF THE INVENTION (1) Field of the Invention

The present invention relates to the field of video data de-interlacing, and in particular to a method and apparatus for reconstructing frames from a line-skipped-sequence of fields.

(2) Description of the Related Art

Interlaced scanning has been invented in the 1930s as a way to improve subjective picture quality of TV images without consuming any extra bandwidth. Since then, interlaced scanning is widely used in many television standards, including the 1080i HDTV broadcast standard. According to an interlaced scanning scheme, an image is divided into two fields that contain odd and even scan lines, respectively. Each field is scanned line by line, from top to bottom.

With interlaced scanning, both fields are captured, transmitted, and displayed subsequently. The afterglow of the phosphor of cathode ray tubes (CRTs), in combination with the persistence of vision results in the two fields being perceived as a continuous image which allows the viewing of full horizontal detail with half the bandwidth which would be required for a full progressive scan while maintaining the necessary CRT refresh rate to prevent flicker.

New display technologies including LCD and plasma displays, however, require video signals according to the progressive scanning standard. Progressive or noninterlaced scanning refers to a scanning method where lines of each frame are strictly drawn in sequence. With progressive scan, an image is captured, transmitted and displayed in a path similar to text on a page: line by line, from top to bottom.

In order to be able to display interlaced video on a progressive scan display device, it is thus necessary to convert the one into the other. Moreover, even converting interlaced video with one spatial resolution to interlaced video with another spatial resolution is generally a multi-step process including interlaced-to-progressive conversion, resolution conversion, and progressive-to-interlaced conversion steps. The process of converting interlaced video into progressive scan video is known as de-interlacing. Obviously, the resulting image quality depends critically on the method employed for de-interlacing.

With an ever-increasing number of alternative TV standards and the need to convert back and forth between any of these standards, high-quality de-interlacing algorithms have attracted a lot of attention recently. Consequently, there is a large variety of different de-interlacing algorithms known in the art, each of which has its specific advantages and drawbacks.

For a discussion of de-interlacing algorithms, two different sources for interlaced video material have to be discerned, namely footage generated by a traditional film camera and footage generated by an (interlaced) video camera. In interlaced video material generated via a telecine process from traditional motion-picture footage with 24 images per second, two consecutive fields are pulled-down from the same original image. Consequently, in case of interlaced video generated by a telecine process, the sequence of original images can be reconstructed faithfully by combining pairs of consecutive fields.

On the other hand, interlaced video cameras capture consecutive fields at different points of time. Unless the captured image is perfectly stationary, two consecutive fields will thus contain information about two different images that cannot be combined in a straightforward manner. This is the realm of state-of-the-art de-interlacing algorithms.

The very same problem as with interlaced footage from video cameras arises if the interlaced video sequence has been generated from a full-resolution progressive scan sequence by applying the so-called line-skipping operation, which is illustrated in FIG. 1a. Starting from a sequence of full-resolution images 110, the line-skipping operation may skip every other line in each frame 120. In order to ensure that stationary objects of a scene are uniformly sampled over time, odd and even lines of consecutive frames are skipped alternately. The lines kept by the line-skipping-operation thus form a sequence of fields 130, each field representing a downsampled version of the corresponding frame.

More generally speaking, the line-skipping operation may keep only every $K^{th}$ line of each frame and discard the other (K−1) lines; cf. FIG. 1b for K=3. To guarantee that non-moving objects of a scene are sampled uniformly over time, downsampling depends on the frame number, i.e. after downsampling K consecutive frames of a full-resolution sequence, all pixels of a frame are sampled once. The result of this line-skipping operation is a sequence, which has a much lower resolution in the vertical direction than in the horizontal direction. This means that frames of size R×C are reduced to size U×C, U=R/K. These fields have a 1/K lower resolution in the vertical direction than in the horizontal direction. It is to be noted that the line-skipping operation with K=2 results in a conventional interlaced sequence with two alternating fields.

The line-skipping operation does not apply any filtering before downsampling in the vertical direction. Consequently, the so-called "line-skipped-sequence" or field sequence is distorted by aliasing. It is obvious that the amount of aliasing in a downsampled signal depends on the signal itself and the downsampling factor K. The bigger the downsampling factor, the larger the overlap of the signal spectrum, the more aliasing artifacts are contained in the sequence.

The aliasing problem is further illustrated in FIG. 2, wherein FIG. 2a is a schematic drawing of the spectrum of the original (band-limited) signal without any aliasing. Converting this signal to an interlaced signal by applying the line-skipping operation with K=2, leads to an overlap of the spectra due to undersampling of the original signal; cf. FIG. 2b. This effect is known as aliasing and leads to overt artifacts such as Moiré patterns. More severe undersampling, for instance by applying the line-skipping operation with K=3 as indicated in FIG. 2c, leads to multiple overlapping spectra and even more pronounced artifacts.

The objective of de-interlacing algorithms is thus to reconstruct the missing lines of the line-skipped sequence, to reduce aliasing, and to increase the vertical resolution of the images. Existing de-interlacing algorithms can be roughly divided into three categories: linear filtering, adaptive (non-linear) techniques, and motion-compensated algorithms.

De-interlacing algorithms based on linear filtering reconstruct missing pixel data by applying a linear filter that has support in the set of available pixel data, i.e., by substituting missing pixel data by a weighted sum of spatially and/or temporally adjacent pixels. These algorithms are generally easy to implement, however, are not effective for either reducing aliasing artifacts or increasing vertical resolution.

FIG. 3 illustrates by way of example a simple de-interlacing algorithm based on linear filtering. FIG. 3a illustrates the line-skipping operation performed on a full-resolution sequence 310 containing an object moving in the course of four frames from the lower-left corner to the upper right corner. Down-sampling with K=3 leads to line-skipped sequence 330 still representing the object moving from the lower-left to the upper-right corner.

In FIG. 3b, a field 321 of the line-skipped sequence 330 is up-sampled by substituting missing lines with respective lines of the previous and the next field; cf. the arrows in FIG. 3b. The thus reconstructed frame 311, however, suffers from severe artifacts, which are due to object motion in the scene.

In order to prevent motion-related artifacts in the de-interlaced sequence, conventional de-interlacing algorithms employ motion compensation techniques. These algorithms typically comprise two additional steps, namely estimating object motion from a sequence of interlaced fields and compensating the motion by shifting the image content accordingly, prior to merging or interpolating consecutive fields.

FIG. 4a illustrates a simple motion compensated de-interlacing algorithm by way of the example shown in FIG. 3a. In addition to the linear-filtering algorithm illustrated in FIG. 3b, the reference fields at time (n−1) and (n+1), i.e., the previous and the next field of the current field at time n, are shifted horizontally in order to compensate for the object movement. The shifted lines of the two reference fields are then employed to substitute the missing lines of the current field, resulting in a—in this example—perfect reconstruction 411 of the original frame.

Although this algorithm may decently handle motion along the horizontal direction, it will fail frequently for motion in the vertical direction, as illustrated in FIG. 4b for the frame at time (n+1), generating another type of disturbing artifact. It is to be noted that the vertical velocity of the moving object is the same in both cases, namely 1 full-resolution pixel per frame. The precise amount of vertical velocity, however, can only be determined from the full-resolution sequence and not from the interlaced sequence. It is further to be noted, that vertical motion compensation can only be performed in steps of the sub-sampling ratio K, i.e., 3, 6, 9, . . . pixels per frame, in this scheme.

From P. Delogne et al., "Improved Interpolation, Motion Estimation, and Compensation for Interlaced Pictures", IEEE Trans. Image Processing, 3:482-491, 1994, an improved de-interlacing algorithm is known that is capable of exactly reconstructing the full-resolution sequence provided that motion vectors are known. According to a generalization of Shannon's sampling theorem, a bandwidth-limited signal with maximum frequency 1/T can be exactly reconstructed from N independent sets of samples, each sample set representing the same signal with a sampling frequency 2/(N T). The above mentioned algorithm exploits this fact by considering lines of a current frame and a previous frame as the two independent sets of samples (N=2), the phase shift between the two sets being determined by the distance of two scan lines and the motion vectors.

FIG. 5a illustrates the de-interlacing algorithm based on the generalized sampling theorem. Filled circles represent existing samples in the interlaced sequence, whereas open circles represent samples to be reconstructed for the current frame. Arrows indicate motion between field at time (n−1) and time n. Hence, at the current time n, two sets of samples are available, namely the regular interlace sample represented by filled circles and the motion-propagated sample of the previous field, represented by crosses in FIG. 5a. From these two sets of samples, the missing samples at the position of the open circles may be calculated.

The step of determining motion vectors is illustrated in FIG. 5b. An object 530 in a current field 520 has moved relative to a previous field 510 of the interlaced sequence. In order to determine the corresponding motion vector, each field is divided into a plurality of blocks, each block consisting of a plurality of pixels 501. A block 550 of the previous field is shifted and compared pixel by pixel to the content of the current field. As a measure for quantifying the match, the mean square error of individual pixel values is conventionally used. The shifted position that yields the best match with the current field is then used to define a motion vector 560 for this block.

For de-interlacing purposes, the motion vectors have to be determined at sub-pel resolution. The above described motion estimation algorithm is thus performed on up-scaled and interpolated versions of the original fields.

Obviously, the performance of this algorithm depends critically on the accuracy of the motion vectors. In a de-interlacing algorithm, however, motion vectors have to be estimated from the aliased low-resolution sequence. Due to this aliasing, motion estimation algorithms fail to estimate sub-pel motion, because a perfect match does not exist. Interpolated samples of two aliasing-distorted fields differ even if there is only translational motion without any noise and occlusion. There is only a perfect match for full-pel shifts. These full-pel shift motion vectors, however, are not of interest to the de-interlacing algorithm, because then the two sets of samples do not fulfill the independence requirement of the generalized sampling theorem, i.e. they contain no additional information. Since motion vectors estimated from interlace video sequences are inherently inaccurate, motion compensation artifacts are introduced that significantly degrade the quality of the reconstructed video sequences.

We are thus left with a chicken and egg situation: On the one hand, accurate motion vectors are required in order to properly de-interlace the signal. On the other hand, motion vectors can only be estimated accurately from a signal free of aliasing artifacts, i.e., the properly de-interlaced signal.

SUMMARY OF THE INVENTION

The aim of the present invention is to overcome the above problems and to provide an improved de-interlacing method and apparatus that do not require accurately determined motion vectors.

This is achieved by the features as set forth in the independent claims.

Preferred embodiments are the subject matter of dependent claims.

It is the particular approach of the present invention to substitute missing lines of a block of a reconstructed full-resolution frame by lines of other fields and to cope with intra-field motion by translating and permuting the substitute lines so as to optimize a smoothness criterion computed for the thus reconstructed block.

According to a first aspect of the present invention, a method for reconstructing full-resolution frames from a line-skipped-sequence of fields is provided. The method includes: receiving a target field and at least one reference field of the line-skipped sequence; up-sampling a target block of the target field in the vertical direction by merging the lines of the target block and the lines of a reference block of the at least one reference field; determining a smoothness value indicating smoothness of pixel data of the up-sampled target block; and determining a position of the reference block within the at least one reference field in accordance with the determined smoothness value so as to optimize the smoothness of the up-sampled target block, wherein in the determining of the position, the position is determined so as to optimize the smoothness value, and in the up-sampling in the vertical direction, the merging is performed using the reference block at the position determined in the determining of the position so as to optimize the smoothness value.

According to a further aspect of the present invention, an apparatus for reconstructing full-resolution frames from a line-skipped-sequence of fields is provided. The apparatus includes: a receiving unit which receives a target field and at least one reference field of the line-skipped sequence; a first up-sampling unit which up-samples a target block of the target field in the vertical direction by merging the lines of the target block and the lines of a reference block of the at least one reference field; a smoothness determining unit which determines a smoothness value indicating smoothness of pixel data of the up-sampled target block; and a position determining unit which determines a position of the reference block within the at least one reference field in accordance with the determined smoothness value so as to optimize the smoothness of the up-sampled target block, wherein the position determining unit determines the position so as to optimize the smoothness value, and the first up-sampling unit performs the merging using the reference block at the position determined by the position determining means so as to optimize the smoothness value.

Preferably, the target field and the at least one reference field of the line-skipped sequence are divided into a plurality of blocks, each block consisting of a plurality of pixels, wherein each of the up-sampling in the vertical direction, the determining of the smoothness value, and the determining of the position is performed on the each block generated in the dividing. In this manner locally inhomogeneous and anisotropic motion can be accounted for.

Preferably, each field of the line-skipped sequence of fields has a vertical resolution that is K-fold lower than the vertical resolution of the full-resolution frames, K being an integer larger than 1. In this case, in the up-sampling in the vertical direction, the target field and the at least one reference field represent a plurality of K fields of the line-skipped sequence of fields, so that the target block is up-sampled by merging the lines of the target block with the lines of K−1 reference blocks, each reference block being taken from a different one of the K−1 reference frames.

In particular, K may equal 2, so that the line-skipped sequence of fields represents an interlaced video signal. However, the present invention is also applicable to general line-skipped sequences, wherein K equals to 3.

Preferably, the target field and the at least one reference field represent a plurality of K consecutive fields of the line-skipped sequence of fields. In this manner, best reconstruction results may be expected, because subsequent fields in an interlaced sequence basically represent the same image content.

According to the present invention, a full-resolution frame can be assembled from a plurality of up-sampled target blocks. In this manner, also an entire sequence of full-resolution frames, each frame corresponding to a field of the line-skipped sequence, may be reconstructed.

Preferably, the target field and the at least one reference field are up-sampled in the horizontal direction by performing horizontal interpolation. Preferably, the target field and the at least one reference field are up-sampled in the horizontal direction by a factor of 2 or 4. In this manner, horizontal motion between each of these fields can be taken into account at sub-pel resolution.

Preferably, the smoothness value is determined by evaluating a predetermined objective function quantifying smoothness of a block of pixel data. The smoothness value may also be determined by applying one of a discrete Fourier transformation, a discrete cosine transformation, or a wavelet transformation to the up-sampled target block and computing the power of transform coefficients representing high frequency components of the up-sampled target block. Alternatively, the smoothness value may be determined by computing pixel differences of neighboring pixels of the up-sampled target block. In addition, the smoothness value may be determined by computing a sum of terms containing pixel differences of neighboring pixels of the up-sampled target block. Any of these methods can be easily implemented and provide a reliable and quantitative measure of the smoothness of a block.

Preferably, the position of the reference block is determined by performing an optimization process with respect to the determined smoothness value. In this manner, the best reconstruction of the Lip-sampled target block can be selected. Furthermore, an optimization algorithm may be selected from the literature that yields the best performance for this particular optimization problem.

Preferably, the position of the reference block is determined by shifting the reference block of the at least one reference field vertically and/or horizontally, in order to determine the position of the reference block so as to optimize the smoothness value. Furthermore, the shifting operation is preferably performed in accordance with the determined smoothness value so as to optimize the smoothness of the up-sampled target block. In this manner, a plurality of different positions of the reference block can be tested and the position that yields the smoothest target block can be selected.

Preferably, the reference fields are selected from the line-skipped sequence of fields, wherein each of the up-sampling in the vertical direction and the determining of the position is performed on at least one of the reference fields selected in the selecting as the at least one reference field of the line-skipped sequence. Furthermore, the selecting operation is preferably performed in accordance with the determined smoothness value so as to optimize the smoothness of the up-sampled target block. In this manner, the fields that yield the best reconstruction result can be selected from the sequence of line-skipped fields.

Preferably, a sequence in which lines of the reference fields are merged into the up-sampled target block is determined. Furthermore the operation of determining the sequence is performed in accordance with the determined smoothness value so as to optimize the smoothness of the up-sampled target block. In this manner, the particular way in which the lines of the reference blocks are merged into the target block can be optimized so as to yield the best reconstruction result.

According to the present invention, de-interlacing for which accurate motion vectors are not required is achieved.

That is, in the conventional de-interlacing employing inter-field interpolating using motion vectors, the used motion vectors estimated from interlaced video sequence are inherently inaccurate, so that motion compensation artifacts are introduced that significantly degrade the quality of the reconstructed video sequence. According to the present invention, however, improved de-interlacing can be achieved without using motion vectors, which reduces aliasing artifacts and also increases the vertical resolution of the images. In other words, the present invention can perform de-interlacing more accurately than the conventional techniques, such as the block matching, which use inaccurate motion vectors.

FURTHER INFORMATION ABOUT TECHNICAL BACKGROUND TO THIS APPLICATION

The disclosure of European Patent Application No. 06025458.8 filed on Dec. 8, 2006 including specification, drawings and claims is incorporated herein by reference in its entirety.

BRIEF DESCRIPTION OF THE DRAWINGS

The above and other objects and features of the present invention will become more apparent from the following description and preferred embodiments given in conjunction with the accompanying drawings, in which:

FIG. 3b is a schematic drawing illustrating an de-interlacing algorithm in accordance with the example from FIG. 3a;

FIG. 4a is a schematic drawing illustrating another de-interlacing algorithm in accordance with the example from FIG. 3a;

FIG. 4b is a schematic drawing further illustrating the de-interlacing algorithm of FIG. 4a in accordance with the example from FIG. 3a;

DESCRIPTION OF THE PREFERRED EMBODIMENT(S)

The following describes in more detail the image reconstructing method according to the preferred embodiment of the present invention with reference to the drawings.

The present invention is based on the observation that natural images tend to be smooth, i.e., values of luminance and chrominance tend to vary in a continuous manner in the spatial directions. Moreover, smoothness of natural images is further enhanced in the image acquisition process due to blurring caused by the imaging system. Blurring may either be a side effect of physical and/or technical limitations or the result of deliberate low-pass filtering to avoid aliasing artifacts in the subsequent sampling step (anti-aliasing filter).

Figure 1A:
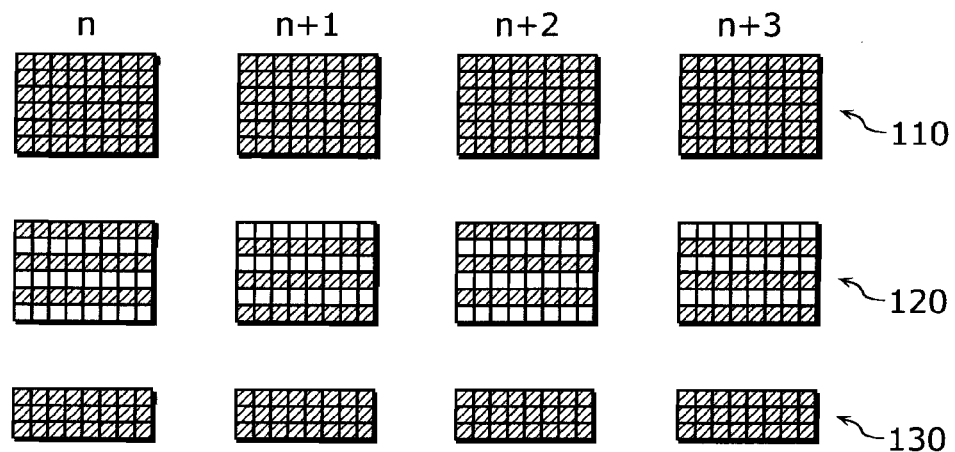
FIG. 1a is a schematic drawing illustrating the line-skipping operation with K=2.
Figure 1B:
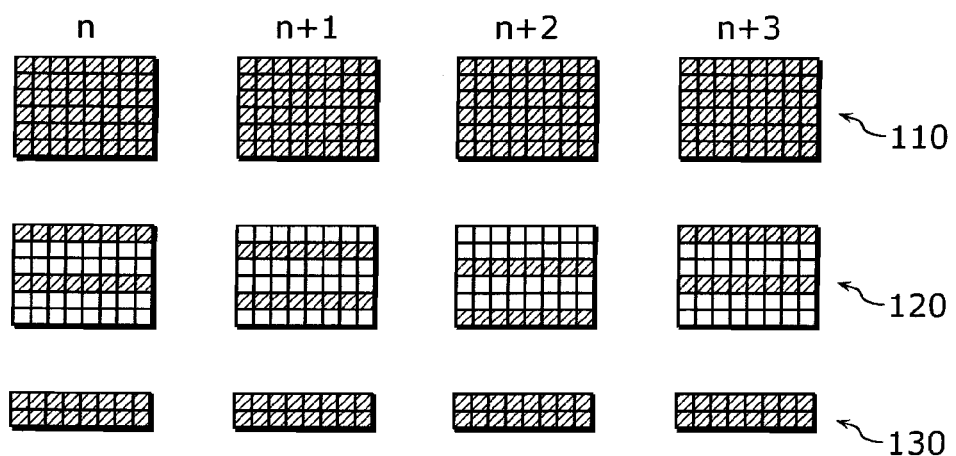
FIG. 1b is a schematic drawing illustrating the line-skipping operation with K=3.
Figure 2A:
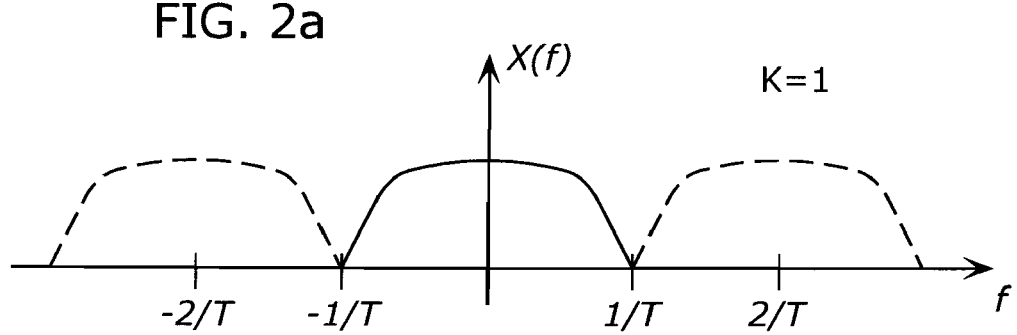
FIGS. 2a to 2c are schematic drawings illustrating the effect of aliasing caused by vertical down-sampling according to the line-skipping operation.
Figure 2B:
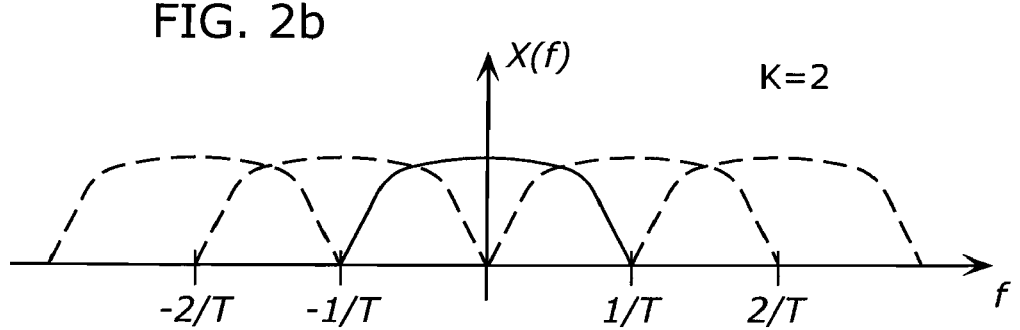
Figure 2C:
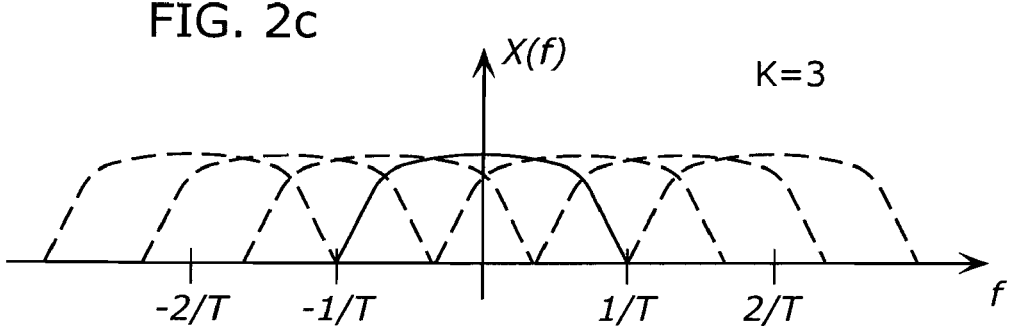
Figure 3A:
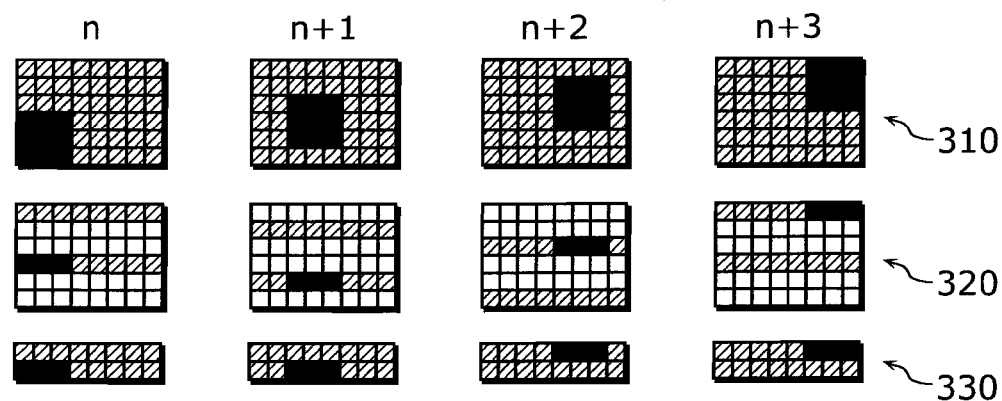
FIG. 3a is a schematic drawing illustrating an example of the line-skipping operation with K=3.
Figure 3B:
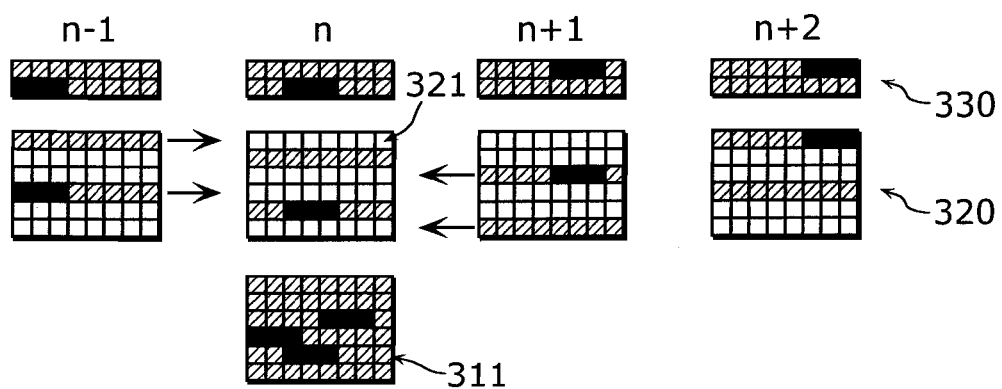
Figure 4A:
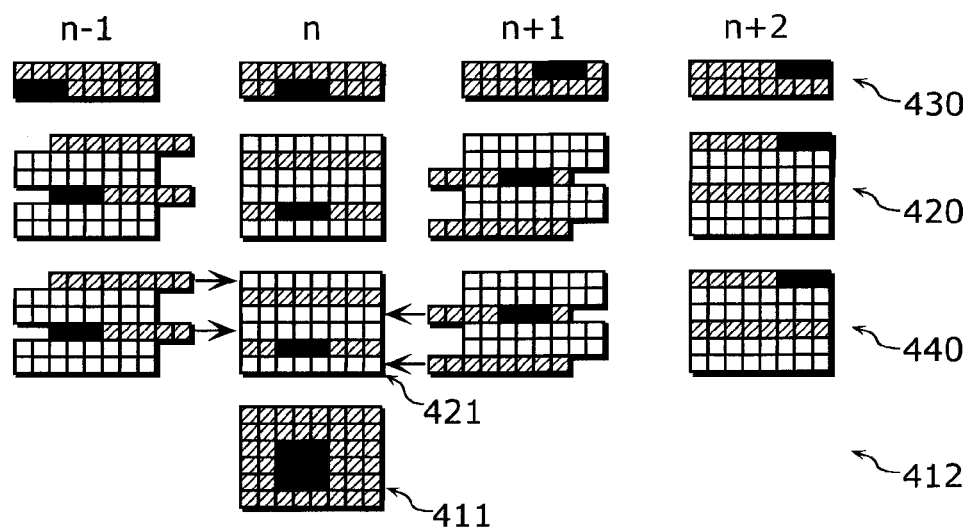
Figure 4B:
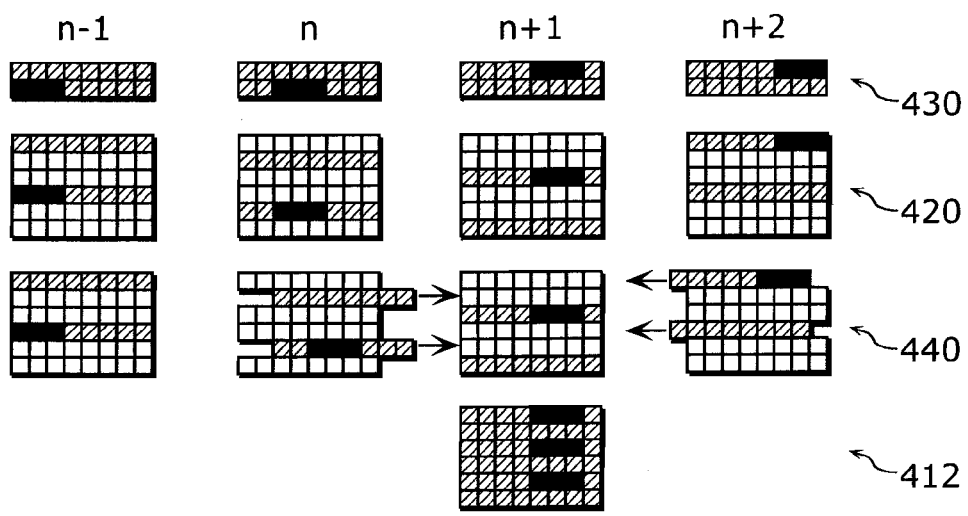
Figure 5A:
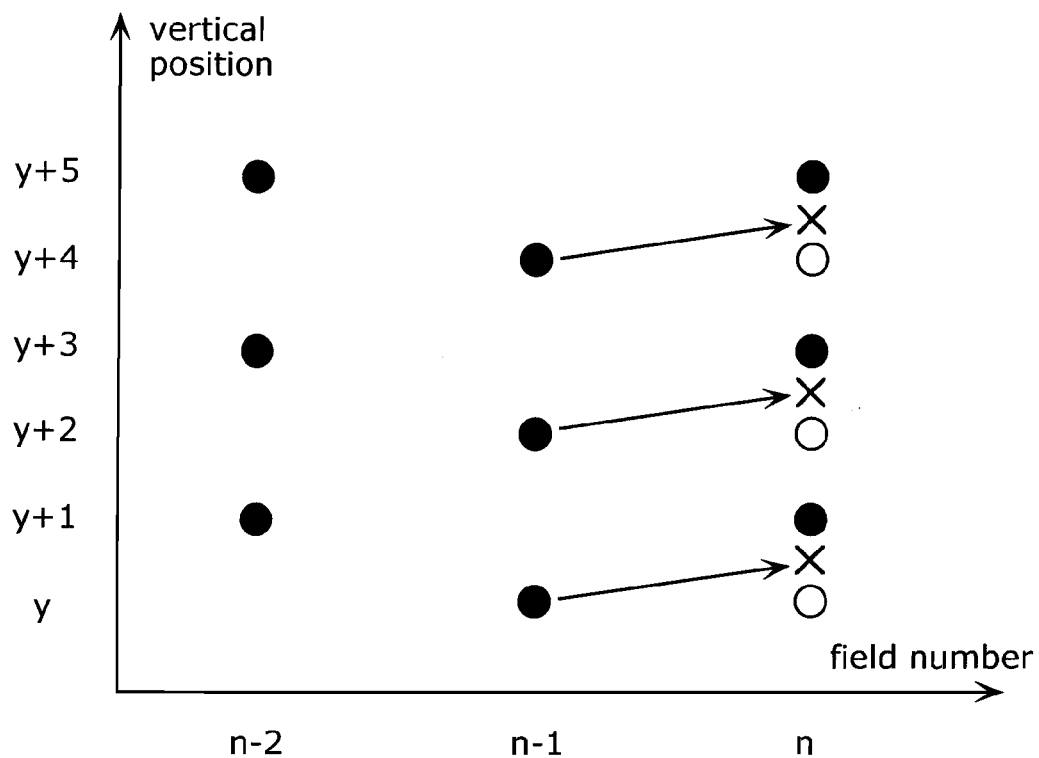
FIG. 5a is a schematic drawing illustrating a conventional de-interlacing algorithm based on a generalization of the sampling theorem.
Figure 5B:
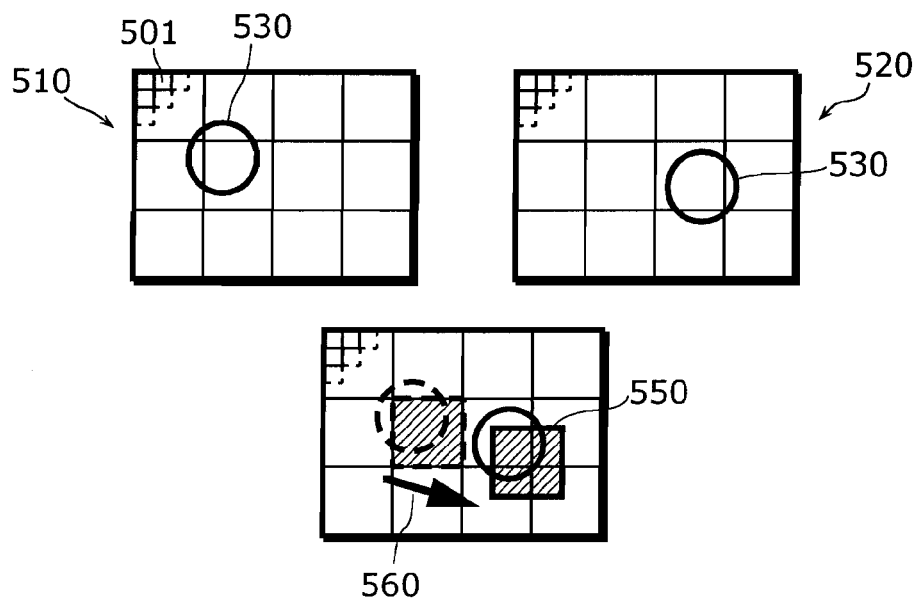
FIG. 5b is a schematic drawing illustrating a conventional motion-estimation algorithm as it is used in conventional de-interlacing algorithms.
Figure 6A:
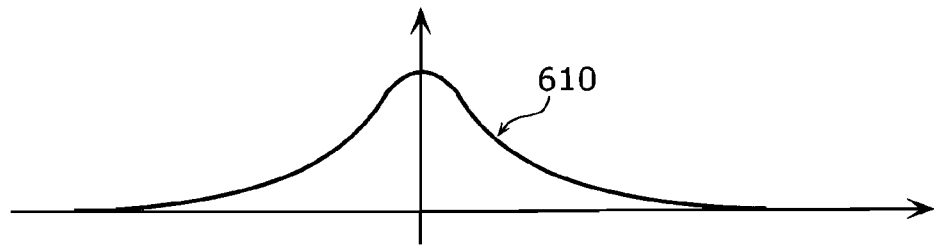
FIG. 6a is a schematic drawing illustrating the point-spread function of an optical imaging system.
Figure 6B:
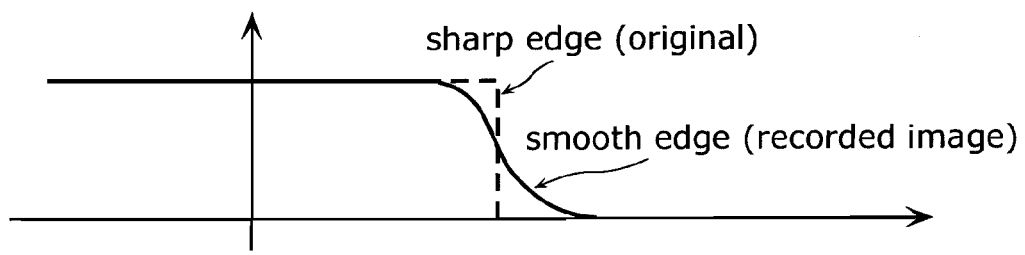
FIG. 6b is a schematic drawing illustrating smoothing of sharp edges due to the point-spread function.

The blurring effect of the optical imaging system can be described by the so-called point-spread function. The point spread function is the impulse response of a linear filter that approximates the imaging properties of the optical system. In digital cameras, for instance, the point-spread function can usually be approximated by a Gaussian function 610, as it is illustrated in FIG. 6a. The input image is thus convolved by the point-spread function, leading to recorded images without sharp edges and impulses; cf. FIG. 6b.

According to this line of argumentation, one may come to the conclusion that a properly de-interlaced frame must be smooth and should not contain any interlacing artifacts consisting of artificial high frequencies. Therefore, the smoothness of the de-interlaced frame can be used as a criterion to find the best de-interlaced frame.

Figure 6C:
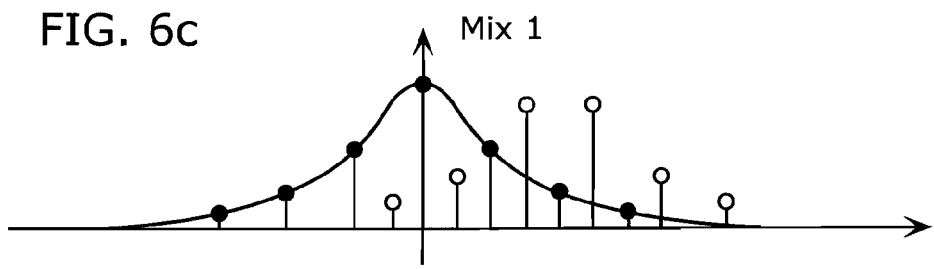
FIG. 6c is a schematic drawing illustrating the effect of the displacement between even and odd samples on the smoothness.
Figure 6C:
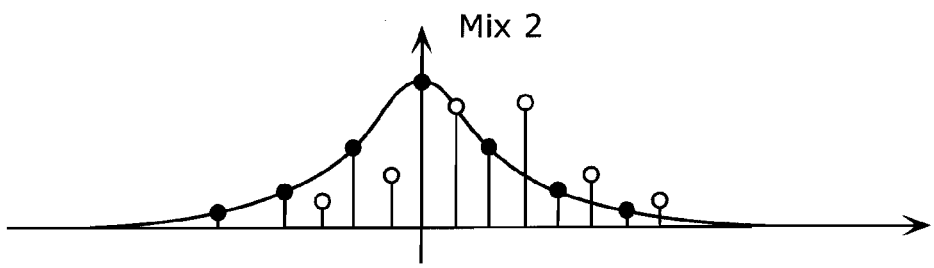
Figure 6C:
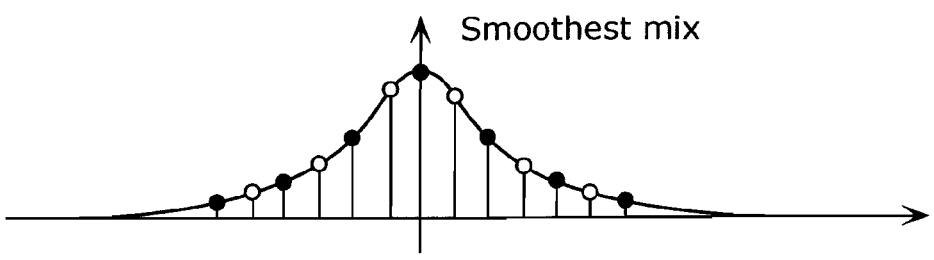

To illustrate this, different combinations of even samples (filled circles) and odd samples (open circles) are shown in FIG. 6c. In this one-dimensional case and for a downsampling factor K=2, all combined 1d-sequences contain the same samples (coming from sampling the original signal indicated by the solid curve). The difference between these combined sequences is the constant full-pel displacement of the even and odd samples. It is obvious that the combined sequences Mix1 and Mix2 exhibit stronger discontinuities than the combined sequence at the bottom of this figure. Since this one is the smoothest combined sequence, it is considered to be the best solution for the de-interlacing problem posed.

It is the particular approach of the present invention to reconstruct frames of the full-resolution sequence by substituting lines missing in the corresponding field by lines from another field, e.g. the preceding field, and translating the substitute lines vertically and horizontally so as to optimized the "smoothness" of the thus reconstructed image. In this manner, any a priori determination of motion vectors based an (erroneous) interpolation of the interlaced images in the vertical direction can be avoided.

In order to account for local motion, these steps are performed block-wise, i.e., the current field is divided into blocks, which are reconstructed independently of each other.

In order to optimize smoothness, an objective function S is defined that quantifies the degree of smoothness of a block of pixel data. For example, this function may involve a (weighted) sum of absolute or squared pixel differences computed over a plurality of neighboring pixels, e.g.

$$S = \sum_{x,y} \sum_{i=-1}^{+1} \sum_{j=-1}^{+1} [p(x, y) - p(x+i, y+j)]^2 \qquad (1)$$

wherein p represents pixel data. Alternatively, a discrete Fourier, cosine, or wavelet transform may be applied to the block of pixel data and the transform coefficients representing high image frequencies may be employed to quantify smoothness, e.g.

$$S = \sum_{\omega_x > \omega_c} \sum_{\omega_y > \omega_c} |p(\omega_x, \omega_y)|^2 \qquad (2)$$

wherein P is the transform of p and ωc represents a minimum frequency.

In any case, it is to be noted that the present invention is not restricted with respect to the particular smoothness measure employed.

The smoothness of the reconstructed image is then optimized by applying any optimization algorithm known in the art, such as gradient ascent, simulated annealing, or genetic algorithms, to mention only a few. In this context, the smoothness of the reconstructed image is considered as the objective function (cost function) and the horizontal and vertical translation of the substitute lines is considered as the parameter that is varied in order to optimize the objective function. Alternatively, the entire parameter space, i.e., all admissible translations within a certain search range, may be systematically searched for the optimum of the above defined objective function.

In addition to checking different translations for the optimum of the objective function, the field employed as the reference field may also be changed. For instance, either the preceding or the succeeding field may be employed as a reference field for substituting missing lines of the current field. Moreover, the reference field may be selected from a plurality of fields in a temporal neighborhood of the current field or even from the entire sequence of fields. This additional degree of freedom may be exploited to further optimize smoothness of the reconstructed frame.

The present invention may likewise handle interlaced sequences generated from a full-resolution sequence by applying the line-skipping operation with K>2. In this case, missing lines of the current field are substituted by lines from (K−1) other fields. With K=3, for instance, only every 3rd line has been kept by the line-skipping operation so that two lines per interlace line have to be substituted by lines from two neighboring fields, e.g., the previous and the next field. In addition to shifting the substitute lines, the substitute lines of different fields may also be permuted. For example in the case with K=3, lines 2, 3, 5, 6, 8, 9, . . . have to be substituted by lines from the previous and the next field. In doing so, lines 2, 5, 8, . . . may be selected from the previous field and lines 3, 6, 9, . . . from the next field, or the other way round. With K>3 even more permutations are possible. This additional degree of freedom may be exploited to further optimize smoothness of the reconstructed frame.

Figure 7A:
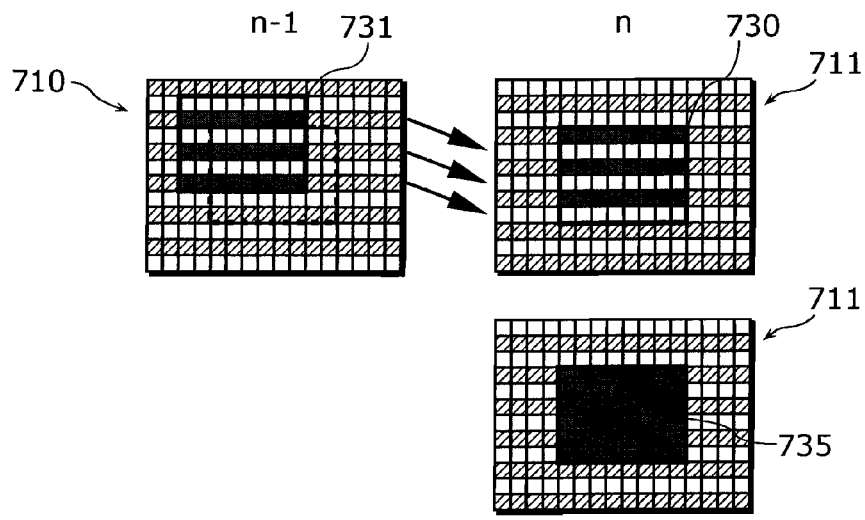
FIG. 7a is a schematic drawing illustrating an example of de-interlacing a line-skipped sequence with K=2 by means of an image reconstructing method in accordance with the present invention.

FIG. 7a exemplifies the present invention for de-interlacing a line-skipped sequence with K=2, i.e., with two alternating fields. A full-resolution block of the current field 711 at time n is reconstructed by substituting missing lines (indicated by open squares) from a same-size block of the preceding field (n−1). The position of the block 731 in the preceding field is shifted horizontally and vertically with respect to the block 730 in the current field so as to optimize smoothness of the reconstructed image 735.

Figure 7B:
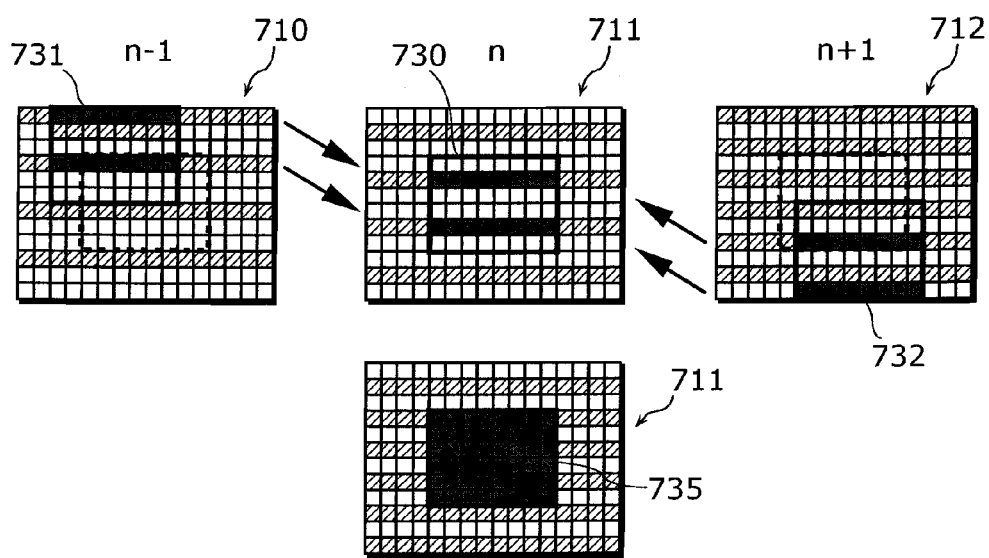
FIG. 7b is a schematic drawing illustrating an example of de-interlacing a line-skipped sequence with K=3 by means of an image reconstructing method in accordance with the present invention.

FIG. 7b exemplifies the present invention for de-interlacing a line-skipped sequence with K=3, i.e., with three alternating fields. A full-resolution block of the current field 711 at time n is reconstructed by substituting missing lines from a same-size block of the preceding field (n−1) and the next field (n+1). The block 731 in the preceding field and the block 732 in the next field are shifted independently of each other in the horizontal and/or vertical direction with respect to the block 730 in the current field so as to optimize smoothness of the reconstructed image 735.

Figure 8:
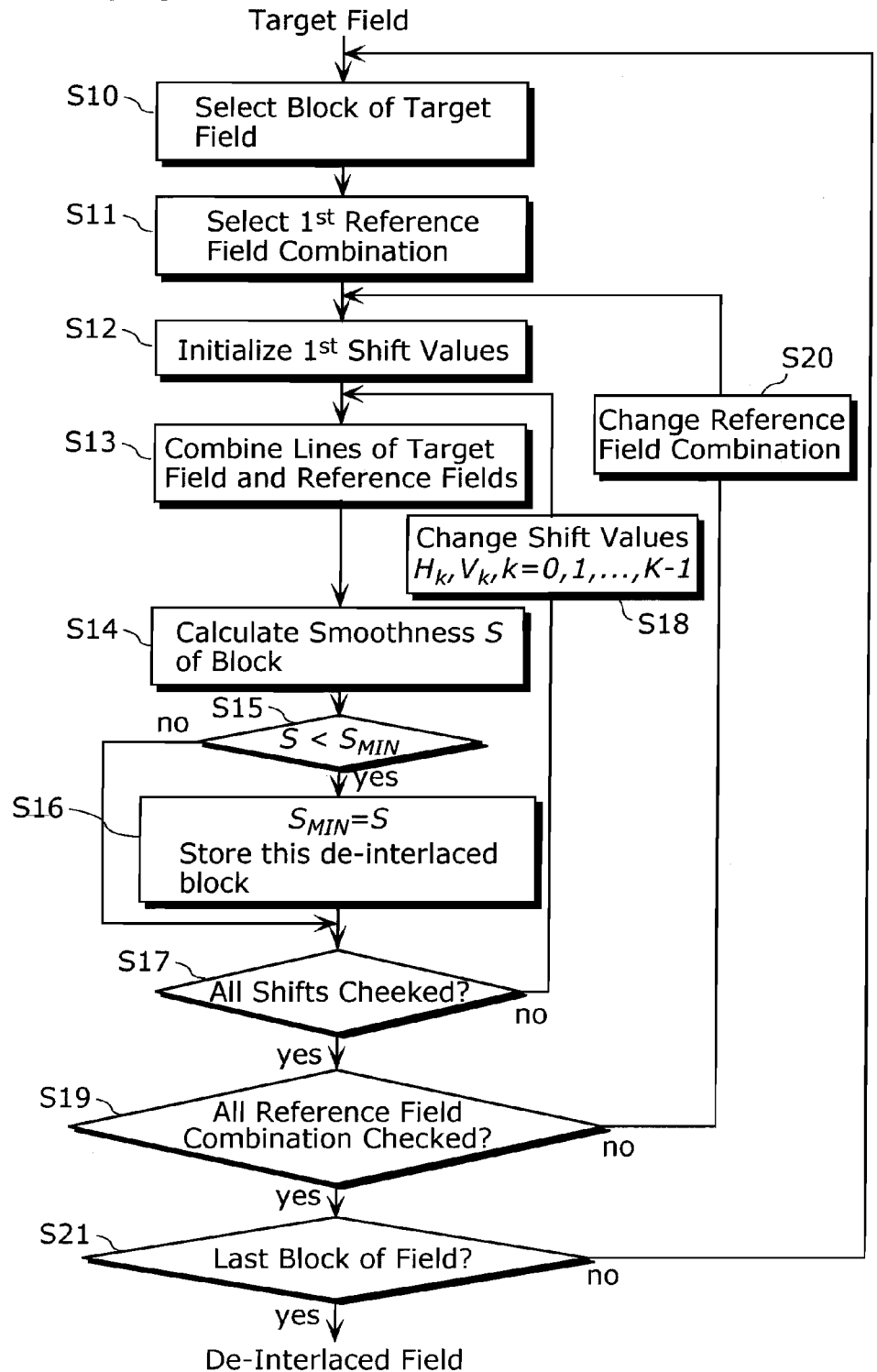
FIG. 8 is a flowchart illustrating an image reconstructing method in accordance with an embodiment of the present invention.

FIG. 8 is a flowchart illustrating an image reconstructing method in accordance with an embodiment of the present invention.

In step S10 a block of the current field (target field) is selected. In step S11 a reference field combination is selected. This step may comprise selecting the reference field(s) to be employed and/or assigning the selected reference fields to the missing lines. For K=2, for instance, the selected reference field combination may either consist of the preceding field or the next field. More generally, the reference field may be selected from a plurality of preceding and/or succeeding fields. For K>2 the selected reference field combination may further define a permutation among the selected reference fields, i.e., a relation between the groups of lines with (y mod K)=1, 2, . . . , K−1, wherein y denotes line number, and the 1st, 2nd, . . . , (K−1)th selected reference field. This permutation will define the order in which substitute lines are merged into the target block, in particular which lines are substituted by which reference block.

In step S12 first shift values are initialized that will be used in step S13 for combining lines of the target field and the reference fields. This step will be further detailed below in connection with FIG. 9.

In step S14 a measure S for the smoothness of the resulting block is computed. As a smoothness measure a sum of absolute pixel differences of neighboring pixels may be employed. Alternatively, the power of high-frequency transform coefficients of the block may be used, such as high-frequency components of a discrete Fourier, cosine, or wavelet transformation. However, the present invention is not restricted in this respect and any measure quantifying smoothness of the pixel data or a combination of such measures may be employed.

In step S15 it is determined whether this value is lower than a previously computed minimum value 5 min. If so, the currently reconstructed block is stored together with the new minimum value in step S16.

In step S17 it is determined whether all shifts within a certain search range have been checked. If not, current shift values for the horizontal and vertical shift of each reference field are changed in step S18 and operation proceeds with step S13. Otherwise it is determined whether all possible reference field combinations have been checked. If not, the current reference field combination is changed in step S20 and processing continuous at step S12. Otherwise, it is determined whether all blocks of the current target field have been processed. If not, the next block is selected in step S10. Otherwise de-interlacing of the target field is completed.

Figure 9:
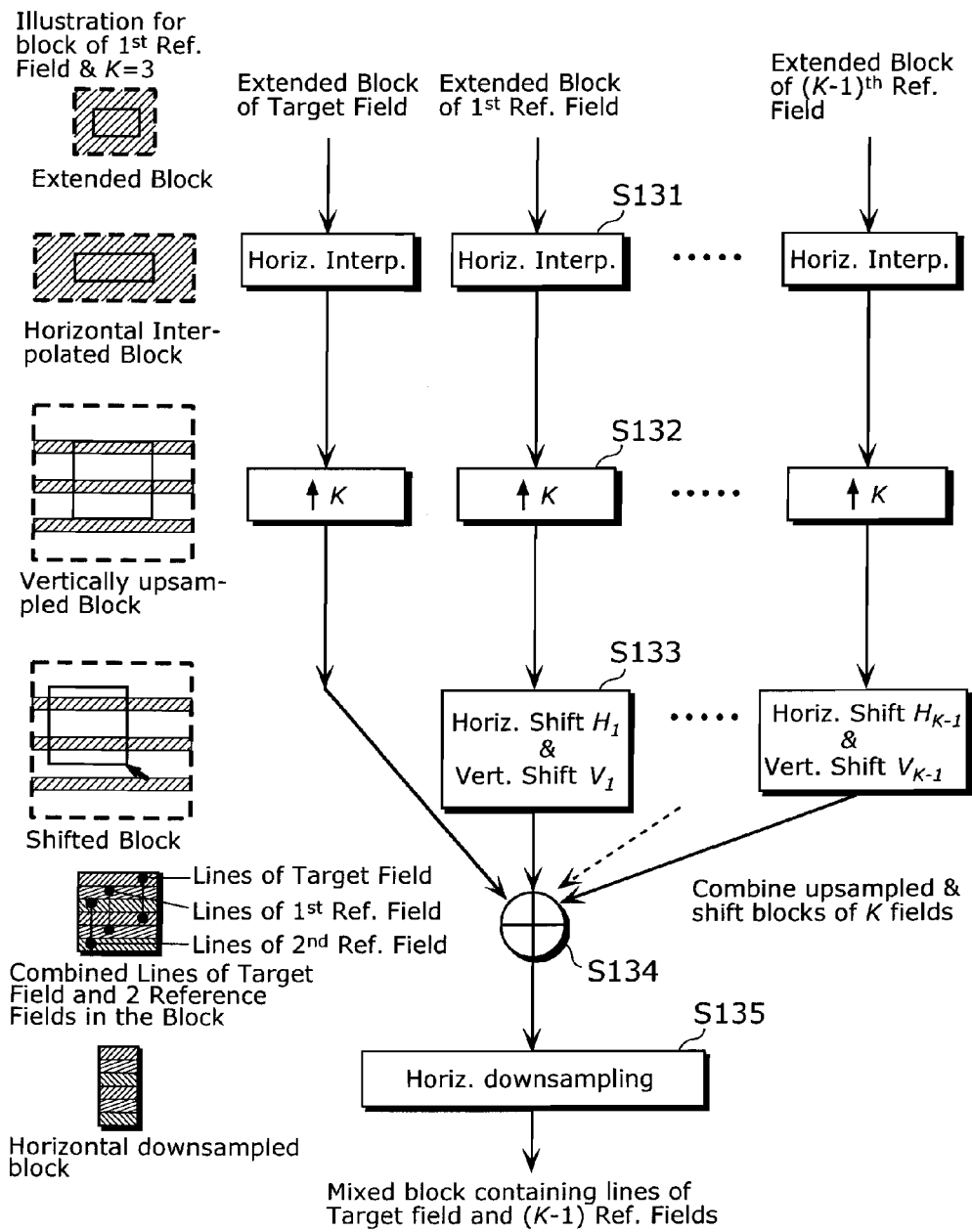
FIG. 9 is a flowchart illustrating the line combination step of an image reconstructing method in accordance with an embodiment of the present invention.

In FIG. 9, it is depicted how the lines of the target field and different reference fields are combined. For this combination, only shifts Vi in the vertical direction are allowed that do not lead to an overlap of samples. This is guaranteed if the vertical shifts for the target field i=0 and each reference field i=1, . . .

, K−1, taken modulo K, i.e., vi=Vi mod K, are pairwise different (the shift V0 of the target field is taken to be zero).

First of all, an extended target block, effectively defining the search range for the optimizing step, is defined for the target field and each reference field. In step S131 each extended block is up-sampled in the horizontal direction by applying horizontal interpolation. It is to be noted that this interpolation is feasible because the line-skipped sequence is only undersampled in the vertical direction but not in the horizontal direction. Due to horizontal up-sampling, for instance by a factor of 2 or 4, horizontal motion can be accounted for with sub-pel accuracy, i.e., half-pel or quarter-pel accuracy.

As an algorithm for performing the horizontal interpolation, any algorithm known in the art may be employed, in particular linear and bi-linear algorithms.

In step S132 each extended block is K-fold up-sampled by inserting the required number of empty lines to meet the desired vertical resolution, i.e., (K−1) empty lines per existing line. In order to facilitate the actual merging step, the up-sampling may be performed so that non-empty lines of two extended blocks do not overlap. For example, this can be achieved by starting the target block with a non-empty line, the first reference block with one empty line followed by a non-empty line, the second reference block with two empty lines, and so on.

In step S133 the reference blocks are shifted within the respective extended block in accordance with horizontal and vertical shift parameters (H1, V1, . . . , HK−1, VK−1), before all blocks are combined in step S134.

It is to be noted that the sequence in which the substitute lines are inserted into the target block may be determined by the set of vertical shift parameters (V1, . . . , VK−1), which are defined with respect to the vertically up-sampled block. In this case, shift parameters have to selected so that samples from any two of the blocks do not overlap when being combined, for instance by ensuring that the (Vi mod K) are pairwise different.

Alternatively, the vertical shifting operation may also be performed prior to the vertical up-sampling step. In this case, shift parameters are defined with respect to the original vertical field resolution. Moreover, shift parameters may then be selected independently of each other, i.e., there is no side condition regarding sample overlap. The order in which the substitute lines are inserted into the target block may then be controlled in the merging step, for instance, in accordance with the selected reference field combination.

The merging step S134 may be implemented so as to simply add the reference blocks to the target block if empty lines are represented by pixel value 0 and if the non-empty lines of the target block and the reference blocks are arranged such that they do not overlap with each other.

Finally, the resulting block is down-sampled in step S135 so as to recover the original horizontal resolution.

As described above, the image reconstructing method according to the present invention is a method for reconstructing full-resolution frames from a line-skipped-sequence of fields. The method is characterized in including: receiving a target field and at least one reference field of the line-skipped sequence (S10 and S11 of FIG. 8); up-sampling a target block of the target field in the vertical direction by merging the lines of the target block and the lines of a reference block of the at least one reference field (S13 of FIG. 8); determining a smoothness value indicating smoothness of pixel data of the up-sampled target block (S14 of FIG. 8); and determining a position of the reference block within the at least one reference field in accordance with the determined smoothness value so as to optimize the smoothness of the up-sampled target block (S12, S17, S18, and S19 of FIG. 8). Here, in the determining of the position, the position is determined so as to optimize the smoothness value, and in the up-sampling in the vertical direction, the merging is performed using the reference block at the position determined in the determining of the position so as to optimize the smoothness value.

By the method, the smoothness is evaluated by merging each of the reference blocks and the target block, then an optimum reference block resulting in the smoothest emerged image is searched, and eventually the target block is merged with the searched optimum reference block. Thereby, improved de-interlacing can be achieved which reduces aliasing artifacts and also increases the vertical resolution of the images without using the motion vectors which are required for the conventional inter-field interpolation.

In other words, the present invention can perform de-interlacing more accurately than the conventional techniques, such as the block matching, which use inaccurate motion vectors. Here, the de-interlacing of the present invention may be achieved by using motion vectors in order to determine an optimum reference block to be merged. In this case, although both of the present invention and the conventional arts use motion vectors, how the motion vectors are estimated is different between the present invention and the conventional arts. That is, in the conventional arts, the best match yielding is performed among images of line-skipped sequences having severe aliasing artifacts, which results in estimating of inaccurate motion vectors. In the present invention, however, the estimation of an estimation value such as the smoothness is performed on a space in an image of a full-resolution sequence which is generated by merging a target image and one or more reference images, so that accuracy of the de-interlacing is increased more than the conventional arts.

Although only the exemplary embodiment of the present invention has been described in detail above, those skilled in the art will be readily appreciate that many modifications are possible in the exemplary embodiment without materially departing from the novel teachings and advantages of the present invention. Accordingly, all such modifications are intended to be included within the scope of the present invention.

For example, although the present invention has primarily been described as a method, it is to be understood that this invention can likewise be embodied as an apparatus or a software product.

Figure 10:
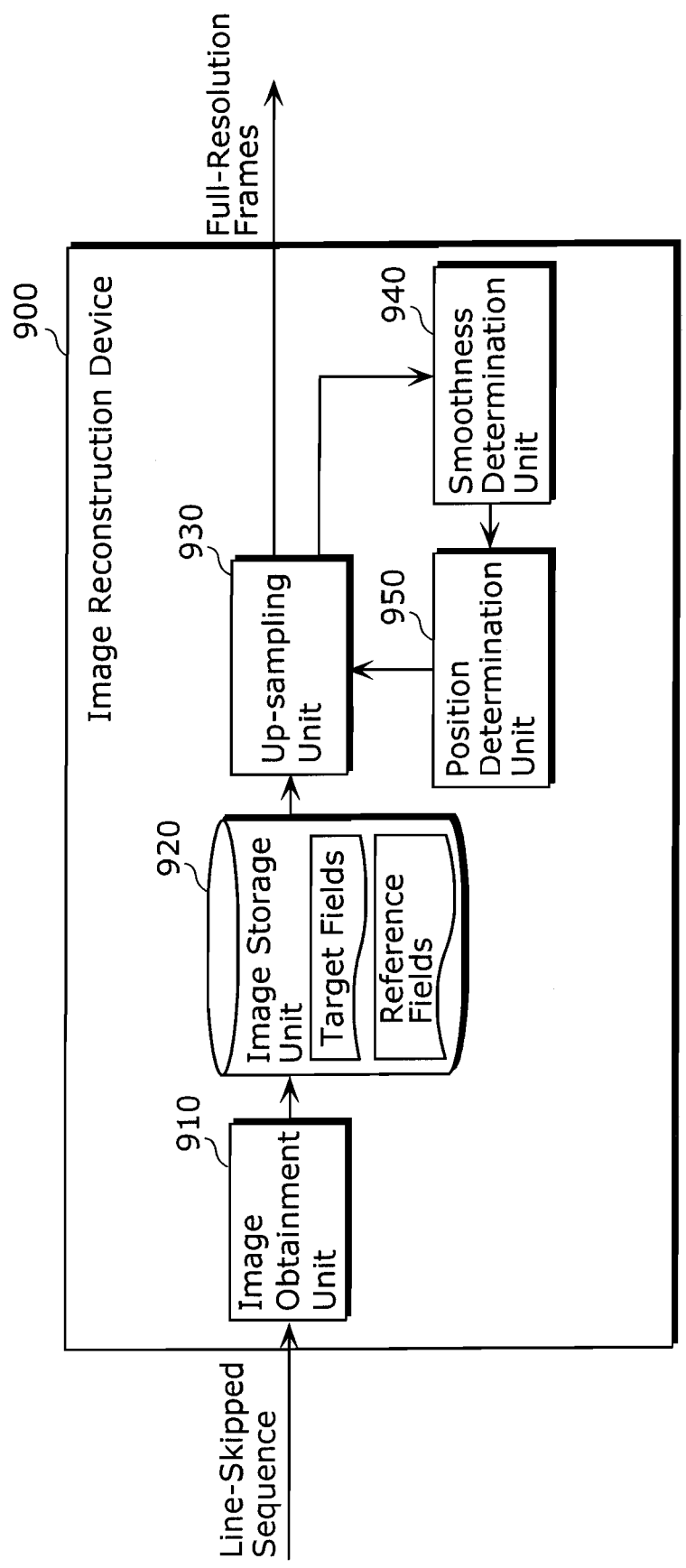
FIG. 10 is a functional block diagram illustrating a structure of an image reconstruction apparatus according to the present invention.

For example, the image reconstruction apparatus according to the present invention is an image reconstruction apparatus 900 shown in FIG. 10 which reconstructs full-resolution frames from a line-skipped-sequence of fields. The image reconstruction apparatus 900 is implemented by a semiconductor integrated circuit such as a single chip large-scale integration (LSI), or by a plurality of circuits or units. The image reconstruction apparatus 900 includes an image obtainment unit 910, an image storage unit 920, an up-sampling unit 930, a smoothness determination unit 940, and a position determination unit 950.

The image obtainment unit 910 is a processing unit which obtains a target field and at least one reference field of the line-skipped-sequence, from a video signal source such as a camera or a recording medium on which video is recorded.

The image storage unit 920 is a buffer memory in which the target field and the reference fields obtained by the image obtainment unit 910 are temporarily stored.

The up-sampling unit 930 is a processing unit which up-samples a target block of the target field in a vertical direction, by merging lines of the target block and lines of reference blocks of the reference fields which are stored in the image storage unit 920.

The smoothness determination unit 940 is a processing unit which determines a smoothness value indicating smoothness of pixel data of the target block up-sampled by the up-sampling unit 930.

The position determination unit 950 is a processing unit which determines a position of the reference block within the reference field stored in the image storage unit 920, in accordance with the smoothness value determined by the smoothness determination unit 940 so as to optimize the smoothness of the target block up-sampled by the up-sampling unit 930. The position determination unit 950 repeats the determining of a position and instructing the up-sampling unit 930 to use the determined position, until the determined position optimizes the smoothness value.

Here, the up-sampling unit 930 repeats the above merging until a reference block at the position determined by the position determination unit 950 to optimize the smoothness value is used. In addition, after merging all of the target fields stored in the image storage unit 920, the up-sampling unit 930 outputs the resulting merged data as full-resolution frames.

The image reconstruction apparatus 900 having the above structure performs the image reconstruction method as described in the above embodiment. Thereby, the image reconstruction apparatus according to the present invention has the same advantages as the image reconstruction method according to the present invention.

Summarizing, the present invention relates to the field of video data de-interlacing, and in particular to a method for reconstructing full-resolution frames from a line-skipped-sequence of fields and a corresponding apparatus. It is the particular approach of the present invention to substitute missing lines of a block of a reconstructed full-resolution frame by lines from another field, e.g. the preceding field, and translating the substitute lines vertically and horizontally so as to optimized a smoothness measure computed for the thus reconstructed block. In this manner, an error-prone a priori determination of motion vectors based an interpolation of the interlaced images in the vertical direction can be avoided. The present invention may also be applied to sequences generated from a full-resolution sequence by a line-skipping operation that keeps only every $K^{th}$ line and discards the other K−1 lines.

It should be noted that it has been described in the embodiment that the reference block resulting in a minimum value of smoothness of the emerged block is searched (Step S15 of FIG. 8). However, the present invention is not limited to the above criterion, but it is also possible to terminate the search from reference blocks and decide the current reference block as the optimum reference block, when it is determined that the smoothness value of the reference block is lower than a predetermined threshold value, in other words, it is smooth. The searching period and the improvement of the smoothness of the reconstructed image are in a trade-off relationship, so that their parameters can be appropriately decided based on a processing time or demand for image quality.

Figure 11:
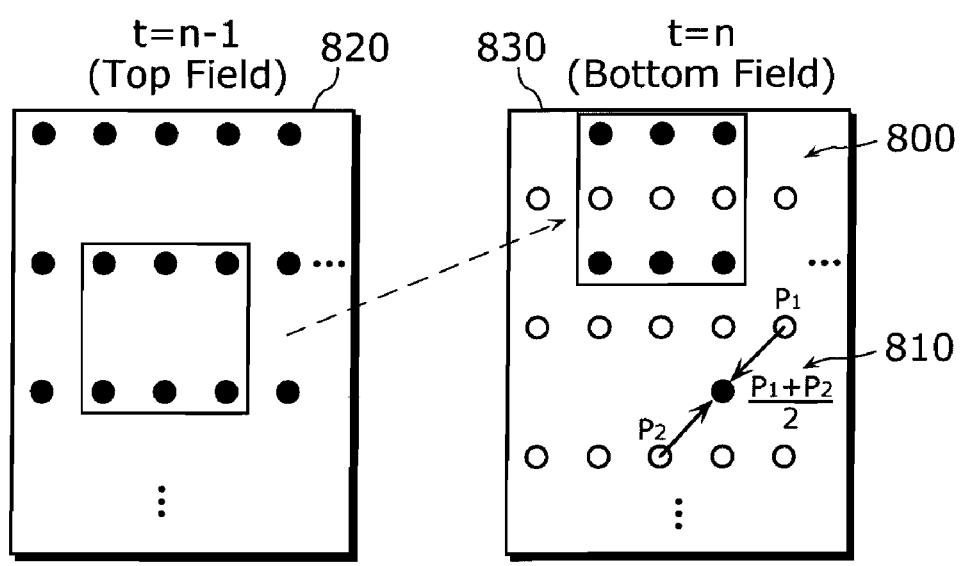
FIG. 11 is a diagram showing inter-field interpolating and intra-field interpolating according to the present invention.

It should also be noted that the frame is reconstructed by inter-field interpolation in the embodiment as shown as interpolation 800 of FIG. 11, but the present invention is not limited to the inter-field interpolation and the frame reconstruction may be performed by intra-field interpolation as shown as interpolation 810 as well as the inter-filed interpolation.

The interpolation 800 of FIG. 11 is the inter-field interpolation described in the embodiment. Assuming a field (bottom field consisting of even lines) 830 at time n as a target field to be reconstructed, and a field (top field consisting of odd lines) 820 at time (n−1) as a reference field, the interpolation 800 shows the processing in which a reference block consisting of odd lines in the field 820 is merged with a target block consisting of even lines in the field 830 so as to evaluate smoothness, and blocks having the smoothest smoothness values are eventually merged together.

On the other hand, the interpolation 810 of FIG. 11 is intra-field interpolation. Assuming the field 830 at time n as a target field to be reconstructed, the interpolation 810 shows the processing in which interpolation is performed using pixel values (pixel values in even lines) in the field 830 so as to calculate pixel values of odd lines. One example of arithmetic operations in the intra-field interpolation is weighted addition operation using pixel values of neighboring pixels.

It is preferable to use this merging method of the intra-field interpolation, in the case where, for example, a reference block to be merged with a target block is searched in the inter-field interpolation described in the embodiment, but a smoothness value of the merged block does not reach a predetermined criterion (it is not smooth), in other words, an appropriate reference block is not found.

The above de-interlacing employing both of the inter-field interpolation and the intra-field interpolation can provide more natural image reconstruction, in the case where the de-interlacing employing only the inter-field interpolation results in rather unnatural image reconstruction due to occurrence of occlusion and image deformation.

Figure 12A:
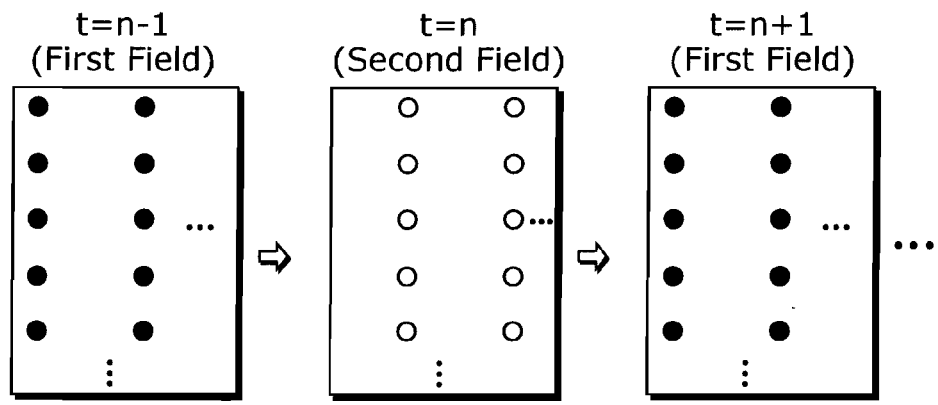
FIG. 12a is a diagram showing video sequence which is decimated in the horizontal direction.
Figure 12B:
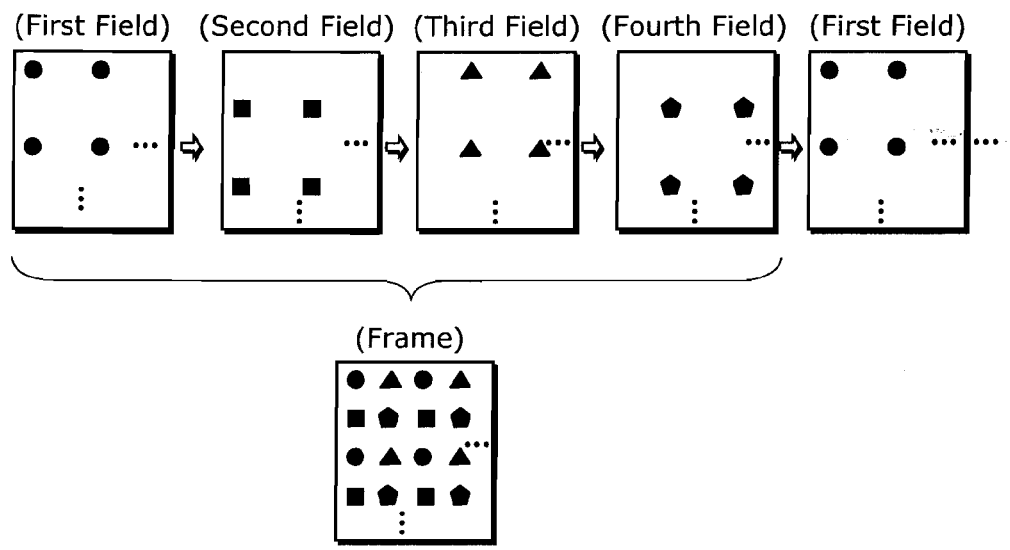
FIG. 12b is a diagram showing video sequence which is decimated in the horizontal and vertical directions.

It should also be noted that it has been described in the embodiment that the image reconstructing method according to the present invention is performed on video decimated in the vertical direction, but the image reconstructing method may be performed on video decimated in the horizontal direction, or video decimated in both of vertical and horizontal directions. Here, the video decimated in the horizontal direction is a video sequence in which the first field consists of only pixels in odd columns, the second field consists of only pixels in even columns, and the first field and the second field are repeated alternately, as shown in FIG. 12(a), for example. On the other hand, the video decimated in the vertical and horizontal directions is a video sequence in which the first field consists of only pixels in odd rows and odd columns, the second field consists of only pixels in even rows and odd columns, the third field consists of only pixels of odd rows and even columns, the fourth field consists of only pixels in even rows and even columns, and a set of the first to fourth fields is repeated, as shown in FIG. 12(b) for example.

As explained above, for the video decimated in the horizontal direction, the image reconstruction method according to the present invention can be applied by replacing the processing in the vertical direction described in the embodiment to the processing in the horizontal direction. On the other hand, for the video decimated in the vertical and horizontal directions, the image reconstruction method according to the present invention can be applied by adding the processing of emerging the target block and the necessary number of reference blocks in the horizontal direction. In this case, the decimated image includes aliasing both in vertical and horizontal direction, and the horizontal interpolation (Step S131) should not be applied.

It should also be noted that only translation is used to search for reference blocks in the present embodiment, but changing of other parameters like rotation or size enlargement and reduction may be used in addition to the translation. In this case, the smoothness estimation is performed between a rotated, enlarged, or reduced reference block and a target block. Here, a degree of the rotation, enlargement, or reduction may be calculated by actually transforming the image, or may be determined based on information, such as information of gyroscope or zooming, which is previously obtained in an imaging device.

INDUSTRIAL APPLICABILITY

The present invention can be achieved not only as the above method but also as the image reconstructing apparatus which reconstructs full-resolution frames from a line-skipped-sequence of fields, such as television sets, image display apparatuses, de-interlacing apparatuses, television signal converters, image high-definition conversion apparatuses, and the like.

What is claimed is:

1. A method for reconstructing full-resolution frames from a line-skipped-sequence of fields, the method comprising:
receiving a target field and at least one reference field of the line-skipped sequence;
up-sampling a target block of the target field in the vertical direction by merging the lines of the target block and the lines of a reference block of the at least one reference field;
determining a smoothness value indicating smoothness of pixel data of the up-sampled target block; and
determining a position of the reference block within the at least one reference field in accordance with the determined smoothness value so as to optimize the smoothness of the up-sampled target block,
wherein in the determining of the position, the position is determined so as to optimize the smoothness value, and
in the up-sampling in the vertical direction, the merging is performed using the reference block at the position determined in the determining of the position so as to optimize the smoothness value.

2. The method according to claim 1, further comprising
dividing the target field and the at least one reference field into a plurality of blocks, each block consisting of a plurality of pixels,
wherein each of the up-sampling in the vertical direction, the determining of the smoothness value, and the determining of the position is performed on the each block generated in the dividing.

3. The method according to claim 1,
wherein each field of the line-skipped sequence of fields has a vertical resolution that is K-fold lower than the vertical resolution of the full-resolution frames, K being an integer larger than 1;
wherein in the up-sampling in the vertical direction, the target field and the at least one reference field represent a plurality of K fields of the line-skipped sequence of fields; and
wherein the target block is up-sampled by merging the lines of the target block with the lines of K−1 reference blocks, each reference block being taken from a different one of the K−1 reference frames.

4. The method according to claim 3,
wherein K equals 2 and the line-skipped sequence of fields represents an interlaced video signal.

5. The method according to claim 3,
wherein K equals to 3.

6. The method according to claim 1,
wherein the target field and the at least one reference field represent a plurality of K consecutive fields of the line-skipped sequence of fields.

7. The method according to claim 1, further comprising
assembling a full-resolution frame from a plurality of up-sampled target blocks.

8. The method according to claim 1, further comprising
up-sampling the target field and the at least one reference field in the horizontal direction by performing horizontal interpolation.

9. The method according to claim 8,
wherein in the up-sampling in the horizontal direction, the target field and the at least one reference field are up-sampled in the horizontal direction by a factor of 2.

10. The method according to claim 8,
wherein in the up-sampling in the horizontal direction, the target field and the at least one reference field are up-sampled in the horizontal direction by a factor of 4.

11. The method according to claim 1,
wherein the determining of the smoothness value includes
evaluating a predetermined objective function quantifying smoothness of a block of pixel data, in order to determine the smoothness value.

12. The method according to claim 1,
wherein the determining of the smoothness value includes
applying one of a discrete Fourier transformation, a discrete cosine transformation, or a wavelet transformation to the up-sampled target block and computing the power of transform coefficients representing high frequency components of the up-sampled target block, in order to determine the smoothness value.

13. The method according to claim 1,
wherein the determining of the smoothness value includes
computing pixel differences of neighboring pixels of the up-sampled target block, in order to determine the smoothness value.

14. The method according to claim 1,
wherein the determining of the smoothness value includes
computing a sum of terms containing pixel differences of neighboring pixels of the up-sampled target block, in order to determine the smoothness value.

15. The method according to claim 1,
wherein the determining of the position includes
shifting the reference block of the at least one reference field vertically and/or horizontally, in order to determine the position of the reference block so as to optimize the smoothness value.

16. The method according to claim 15,
wherein the shifting is performed in accordance with the determined smoothness value so as to optimize the smoothness of the up-sampled target block.

17. The method according to claim 1, further comprising
selecting the reference fields from the line-skipped sequence of fields,
wherein each of the up-sampling in the vertical direction and the determining of the position is performed on at least one of the reference fields selected in the selecting as the at least one reference field of the line-skipped sequence.

18. The method according to claim 17,
wherein the selecting is performed in accordance with the determined smoothness value so as to optimize the smoothness of the up-sampled target block.

19. The method according to claim 1, further comprising
determining a sequence in which lines of the reference fields are merged into the up-sampled target block.

20. The method according to claim 19,
wherein the determining of the sequence is performed in accordance with the determined smoothness value so as to optimize the smoothness of the up-sampled target block.

21. A computer program product comprising a non-transitory computer readable medium having computer readable program code embodied thereon, the program code being adapted to carry out all operations of claim 1.

22. An apparatus for reconstructing full-resolution frames from a line-skipped-sequence of fields, the apparatus comprising:
   a receiving unit operable to receive a target field and at least one reference field of the line-skipped sequence;
   a first up-sampling unit operable to up-sample a target block of the target field in the vertical direction by merging the lines of the target block and the lines of a reference block of the at least one reference field;
   a smoothness determining unit operable to determine a smoothness value indicating smoothness of pixel data of the up-sampled target block; and
   a position determining unit operable to determine a position of the reference block within the at least one reference field in accordance with the determined smoothness value so as to optimize the smoothness of the up-sampled target block,
wherein the position determining unit determines the position so as to optimize the smoothness value, and
the first up-sampling unit performs the merging using the reference block at the position determined by the position determining means so as to optimize the smoothness value.

* * * * *